(12) United States Patent
Tucco et al.

(10) Patent No.: US 10,697,542 B2
(45) Date of Patent: Jun. 30, 2020

(54) TRANSMISSION SYSTEM HAVING MANUAL OVERRIDE MECHANISM

(71) Applicant: Ford Global Technologies, LLC, Dearborn, MI (US)

(72) Inventors: Jonathan Michael Tucco, Canton, MI (US); John Brock, Troy, MI (US); Shailesh Patke, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 10 days.

(21) Appl. No.: 16/130,356

(22) Filed: Sep. 13, 2018

(65) Prior Publication Data

US 2020/0088296 A1    Mar. 19, 2020

(51) Int. Cl.
*F16H 63/34* (2006.01)
*F16H 61/12* (2010.01)

(52) U.S. Cl.
CPC ..... *F16H 63/3491* (2013.01); *F16H 63/3425* (2013.01); *F16H 2061/1224* (2013.01)

(58) Field of Classification Search
CPC ............. F16H 63/3491; F16H 63/3425; F16H 2061/1224; F16H 63/3416; F16H 63/3433
See application file for complete search history.

(56) References Cited

U.S. PATENT DOCUMENTS

| 6,592,492 | B1 | 7/2003 | Kalia | |
| 7,241,244 | B2 | 7/2007 | Wang | |
| 8,437,930 | B2 | 5/2013 | Park | |
| 9,518,657 | B2* | 12/2016 | Kristofcsak | F16H 63/18 |
| 2006/0278029 | A1* | 12/2006 | Burgbacher | F16H 59/08 |
| | | | | 74/335 |

FOREIGN PATENT DOCUMENTS

WO    2017003481 A1    1/2017

\* cited by examiner

*Primary Examiner* — Jacob S. Scott
(74) *Attorney, Agent, or Firm* — Vincent Mastrogiacomo; Brooks Kushman P.C.

(57) ABSTRACT

A vehicle includes a transmission having a park-override shaft. The vehicle further includes an override mechanism that includes a cannister disposed about the park-override shaft, a cam rotatably fixed to the park-override shaft, and a pawl rotatably secured to the cam. The vehicle further includes an override cable secured at a first end to the cam and at a second end to an actuator disposed within a cabin of the vehicle. Actuation of the actuator rotates the cam and displaces the pawl.

20 Claims, 3 Drawing Sheets

TRANSMISSION SYSTEM HAVING MANUAL OVERRIDE MECHANISM

TECHNICAL FIELD

This disclosure relates to automatic transmissions and in particular to electronic shift transmissions. More particularly, this disclosure relates to an override for shifting an electronic shift transmission from a Park position without engine power.

BACKGROUND

A traditional automatic transmission includes a transmission control device employed to control the transmission of a motor vehicle. The transmission control device is used to select several ranges, such as Park, wherein the transmission is locked to prevent the vehicle from moving, Neutral, wherein the transmission allows the vehicle to be moved freely, such as when being towed, Reverse, wherein the transmission allows the vehicle to move backwards, and one or more Drive ranges that enable forward motion of the vehicle. Usually, the transmission control device is in the form of a lever connected to the transmission via a mechanical connection, such as a cable. Typically, the lever is also connected to an indicator. As the transmission control mechanism is moved from one range to another, the mechanical connection physically shifts the transmission to the selected setting and the indicator moves to show the driver which range has been selected. Even if the vehicle is turned off, the driver is able to determine the current transmission range from the indicator and, in some cases, is able to move the transmission control mechanism to Neutral if, for example, the vehicle is to be towed.

The traditional automatic transmission utilizes multiple friction elements for automatic gear ratio shifting. Broadly speaking, these friction elements may be described as torque establishing elements, although more commonly they are referred to as clutches or brakes. The friction elements function to establish power flow paths from an internal combustion engine to a set of vehicle traction wheels. During acceleration of the vehicle, the overall speed ratio, which is the ratio of a transmission input shaft speed to a transmission output shaft speed, is reduced during a ratio upshift as vehicle speed increases for a given engine throttle setting. A downshift to achieve a higher speed ratio occurs as an engine throttle setting increases for any given vehicle speed, or when the vehicle speed decreases as the engine throttle setting is decreased. Various planetary gear configurations are found in modern automatic transmissions. However, the basic principle of shift kinematics remains similar. Shifting an automatic transmission having multiple planetary gear sets is accompanied by applying and/or releasing friction elements to change speed and torque relationships by altering the torque path through the planetary gear sets. Friction elements are usually actuated either hydraulically or mechanically based on the position of the transmission control device.

In an electronic shift transmission arrangement, the mechanical connection between the transmission control device and the transmission is eliminated. Instead, the transmission control device transmits an electrical signal to an electronic controller, which directs separate actuators to apply or release the various friction elements to obtain a desired gear ratio. The control device is no longer necessarily in the form of a lever because the control device is no longer moving a mechanical connection for controlling the transmission. Instead, the control device is typically an electro-mechanical interface (e.g., a series of buttons, lever, or knob) that is used to instruct the transmission to switch between the transmission ranges. Electronic shift transmissions typically default to the PARK position when failure occurs (e.g., loss of electrical power or transmission hydraulic power) or when a driver opens the door while the transmission is not in PARK.

SUMMARY

In at least one approach, a vehicle includes a transmission that includes a park-override shaft. The vehicle may further include an override mechanism that includes a cannister disposed about the park-override shaft, a cam rotatably fixed to the park-override shaft, and a pawl rotatably secured to the cam. The vehicle may further include an override cable that may be secured at a first end to the cam and at a second end to an actuator disposed within a cabin of the vehicle. Actuation of the actuator may rotate the cam and may displace the pawl.

In at least one approach, a vehicle is provided. The vehicle may include a user-operable actuator disposed within a passenger cabin of the vehicle and a transmission that may include a park-override shaft. The vehicle may further include an override mechanism that may include a cannister, a cam, and a pawl. The cannister may have an annular wall extending about a central axis and may include first and second teeth located at an inner surface. The cannister may further include a peripheral aperture extending from the inner surface to an outer surface. The cam may be rotatable within the annular wall about the central axis and may include a pin. The pawl may be rotatably secured to the pin to engage the first and second teeth. The vehicle may further include an override cable that may be secured at a first end to the cam and at a second end to the user-operable actuator. Actuation of the actuator may effect rotation of the cam and park-override shaft into an override configuration, and may effect displacement of the pawl from the first tooth to the second tooth to secure the park-override shaft in the override configuration.

In at least one approach, an override mechanism for a transmission is provided. The override mechanism may include a cannister, a cam, and a pawl. The cannister may have an annular wall extending about a central axis and may include first and second teeth located at an inner surface. The cannister may have a peripheral aperture extending from the inner surface to an outer surface. The cam may be rotatable within the annular wall about the central axis and may include a pin. The pawl may be rotatably secured to the pin to engage the first and second teeth.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
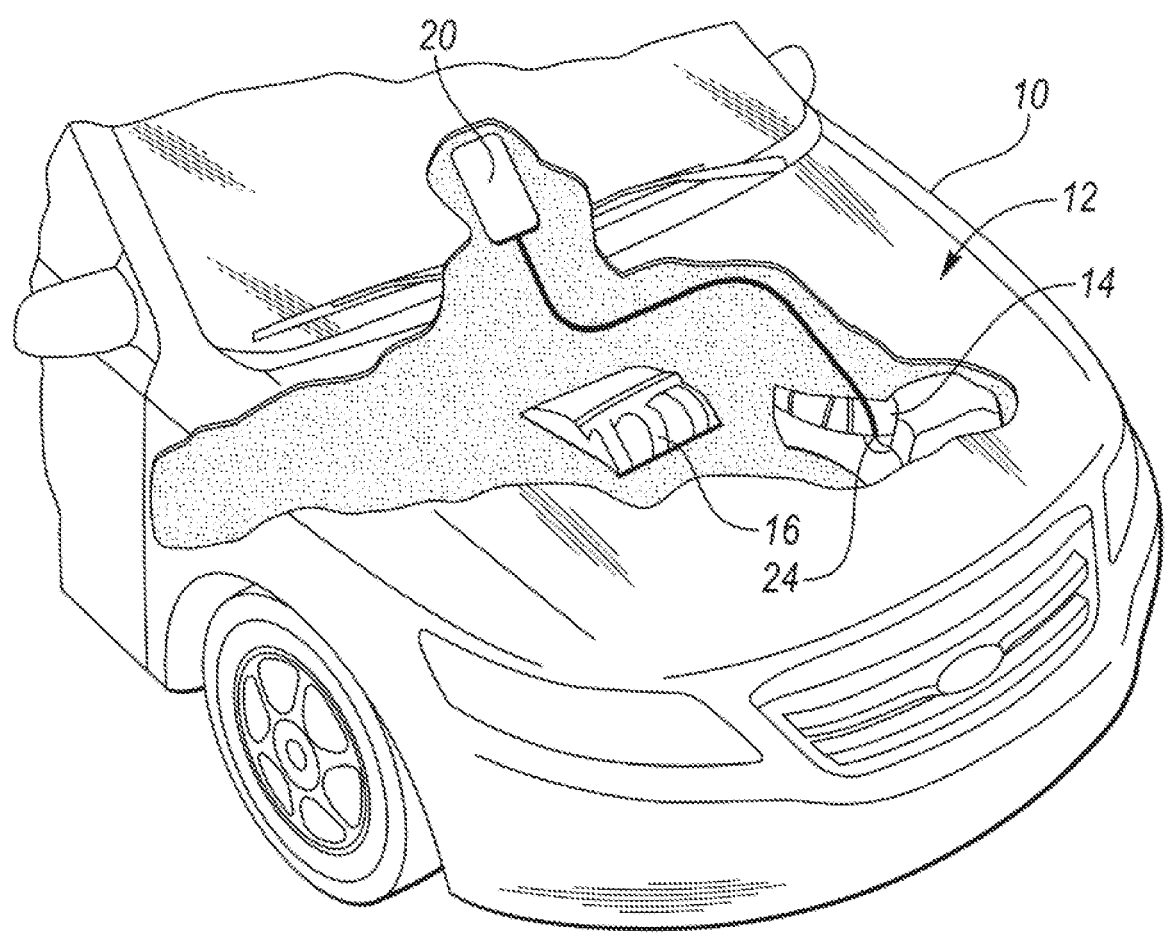
FIG. 1 is a partial view of a vehicle including a transmission system.

Referring now to FIG. 1, a vehicle 10 may include a transmission system 12. The transmission system 12 may be a shift-by-wire system. A vehicle operator may select a desired transmission operating range, which may include, without limitation, Park (P), Reverse (R), Neutral (N), Drive (D), and Low (L), corresponding respectively to Park, Reverse, Neutral, Drive and Low operating ranges. The transmission system 12 may include a multiple-speed automatic transmission 14 that may shift to the selected operating range. The vehicles powertrain includes a power source 16, such as an electric machine or an internal combustion engine, that may be driveably connected to the transmission 14.

The transmission system 12 may include an actuator 20 and a linkage that links the actuator 20 to the transmission 14. The linkage may be a mechanical linkage, a hydraulic linkage, an electrical linkage, or other suitable linkage. In at least one approach, the linkage is a mechanical linkage through an override cable 22. The override cable 22 may link the actuator 20 to a park-override shaft 24 at the transmission 14.

The actuator 20 may be secured at any convenient place in the vehicle 10. In the approach shown in FIG. 1, the actuator 20 may be located within a passenger compartment or cabin 30 of the vehicle 10. In this way, an operator may actuate the actuator 20 from within the cabin 30.

The transmission system 12 may permit a user to operate the park-override shaft 24 of the transmission 14 even when the vehicle loses power, for example, due to the battery being fully discharged. More particularly, a manual park release (MPR) cable system may permit the vehicle 10 to be shifted out of park, even when the vehicle 10 has lost power. This may allow for the vehicle 10 to be rolled or towed when the vehicle is otherwise without power.

Figure 2:
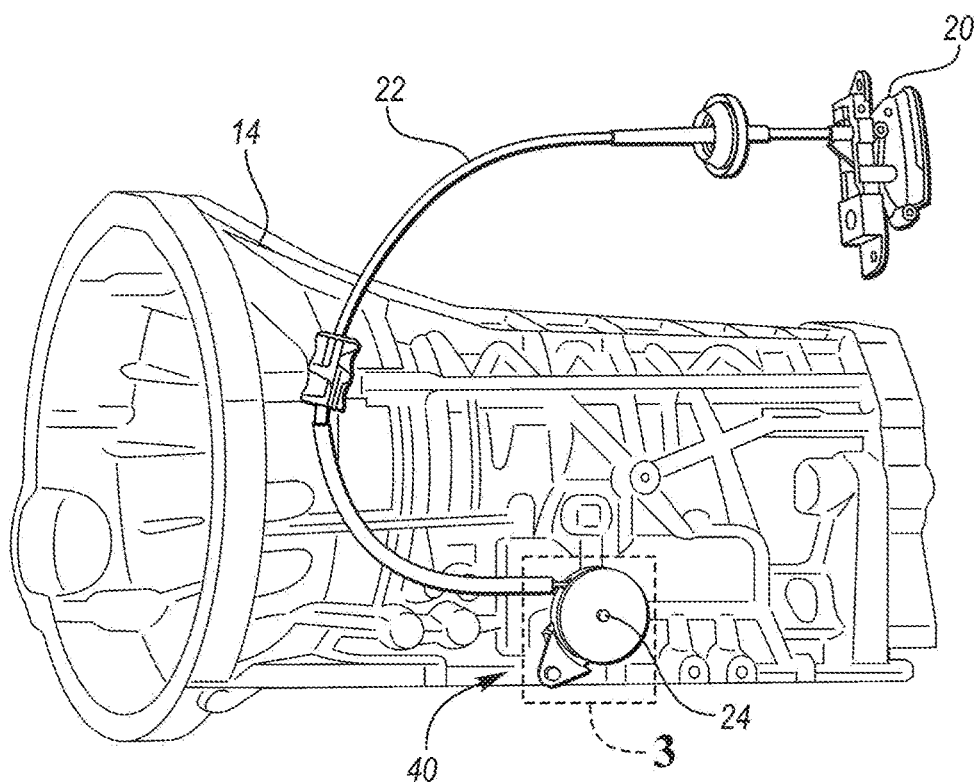
FIG. 2 is a perspective view of the transmission system.

Referring to FIG. 2, the actuator 20 may be a user-operable actuator such as a pull lever. As discussed, the actuator 20 may be disposed in the cabin of a vehicle. The override cable 22 may extend from the actuator 20 to the transmission 14. More particularly, the override cable 22 may extend from the actuator 20 to an override mechanism 40 at the transmission 14.

Figure 3:
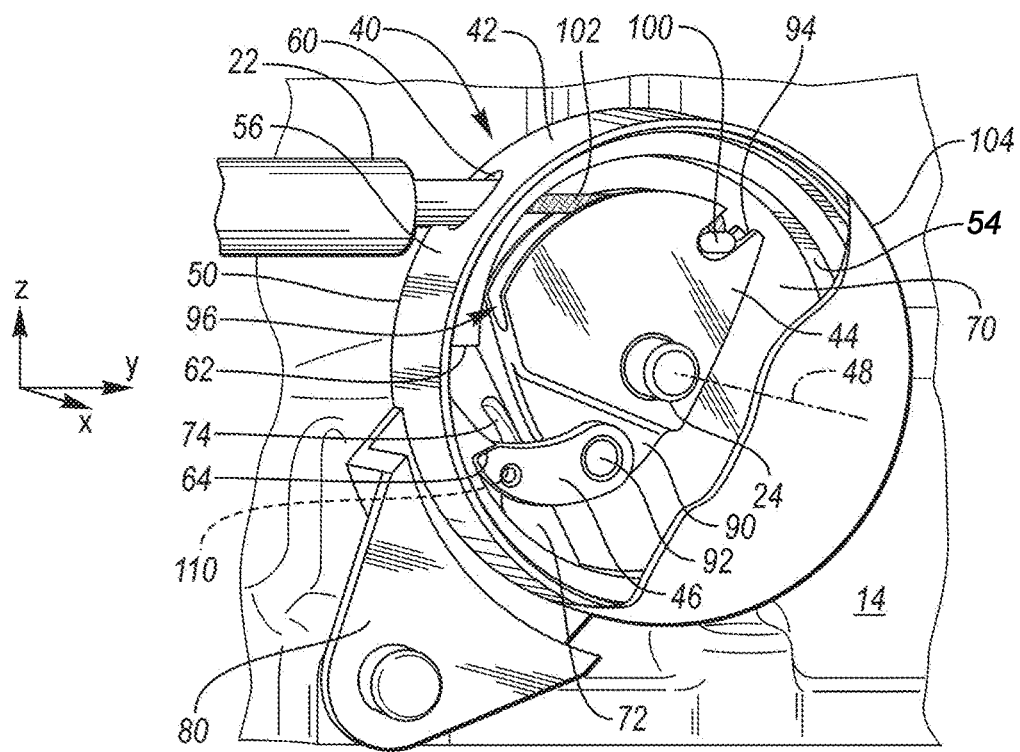
FIG. 3 is an enlarged view of an override mechanism of the transmission system.
Figure 4:
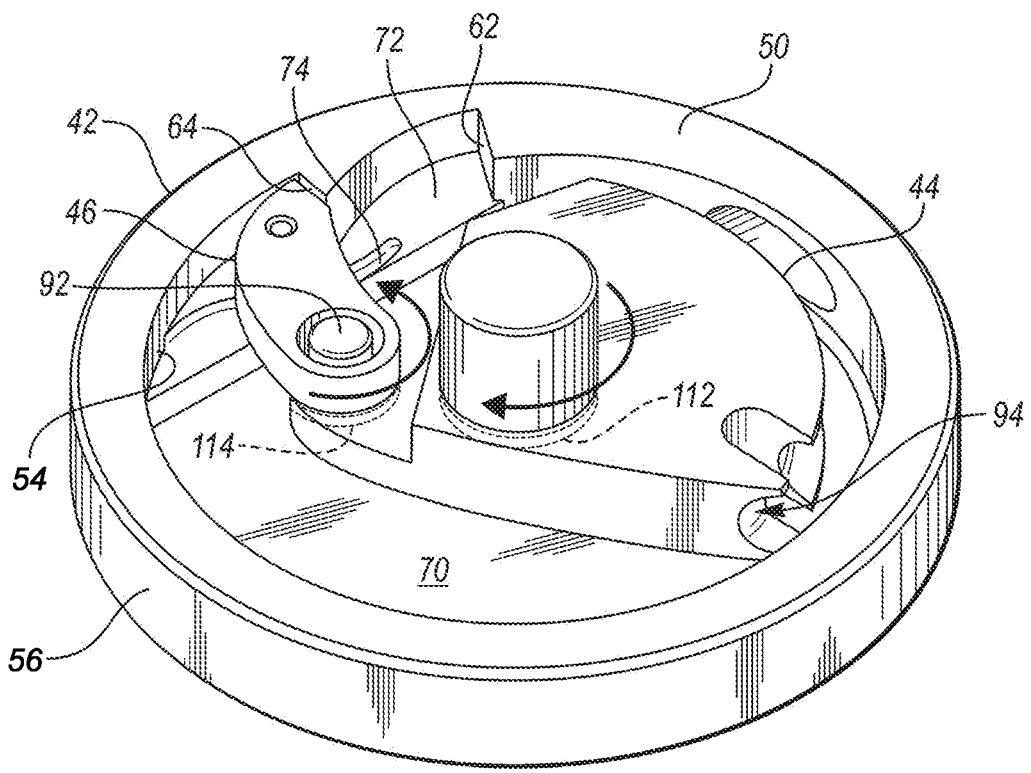
FIG. 4 is a perspective view of the override mechanism.

Referring to FIGS. 3 and 4, the override mechanism 40 may include a cannister 42, a cam 44, and a pawl 46. The cannister 42 may be disposed about the park-override shaft 24. The cam 44 may also be disposed about the park-override shaft 24. The cam 44 may be rotatable relative to the cannister 42.

The cannister 42 may have an annular wall 50 that extends about a central axis 48. The annular wall 50 may define an inner surface 54 and an outer surface 56. A peripheral aperture 60 may extend through the annular wall 50; for example, from the outer surface 56 to the inner surface 54. As shown in FIG. 3, the override cable 22 may extend through the peripheral aperture 60 to an interior region of the cannister 42.

The cannister 42 may include one or more teeth. For example, the inner surface 54 of the cannister 42 may define a first tooth 62 and a second tooth 64. The first and second teeth 62, 64 may be in the form of ratchet teeth and may have a planar abutment surface (which may receive the pawl 46, as discussed in greater detail elsewhere herein).

Figure 5:
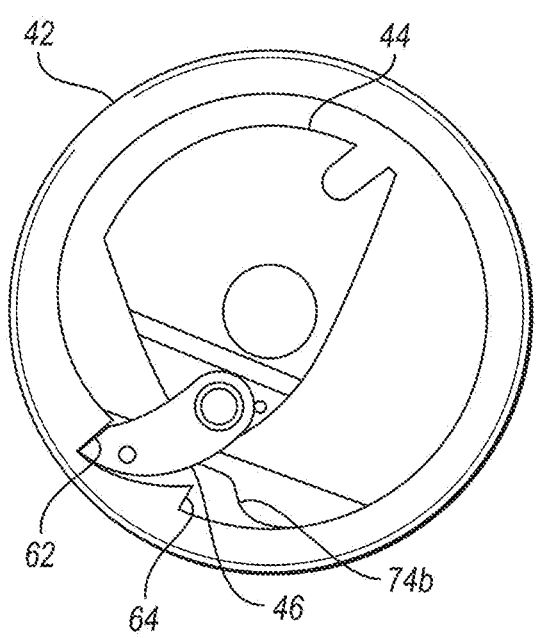
FIG. 5 is an elevation view of the override mechanism in a first configuration.
Figure 6:
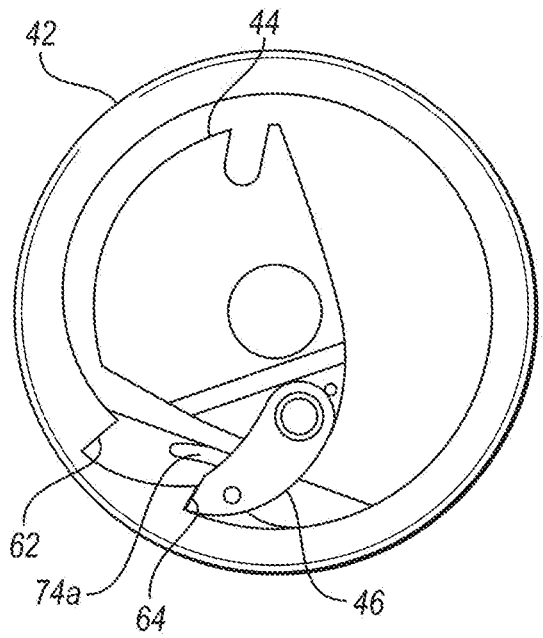
FIG. 6 is an elevation view of the override mechanism in a second configuration.

The cannister 42 may include a backing plate 70, which may be a planar backing plate. The cannister 42 may further include a shelf 72 that may extend (e.g., in a direction of the axis 48) from the backing plate 70. The shelf 72 may extend in a plane that is offset from a planar face of the backing plate 70. The shelf 72 may be disposed adjacent to the first and second teeth 62, 64. The shelf 72 may define a return-groove 74. The return-groove 74 may be adjacent to the first and second teeth 62, 64. In at least one approach, the return-groove 74 is a ramped return-groove. In this way, the return-groove 74 may have a first depth in a first region 74a adjacent the first tooth 62, and a second depth greater than the first depth in a second region 74b adjacent the second tooth 64, as shown in FIGS. 5 and 6.

The return-groove 74 may be the form of a channel having opposing channel walls. The return-groove 74 may be in the form of a ridge having only one upstanding wall for engaging a detent of the pawl 46. In still another approach, the return-groove 74 may include a combination of a channel and a ridge. For example, the first region 74a may be a channel, and the second region 74b may be a ridge.

The cannister 42 may include a flange 80 that may extend from the annular wall 50 (e.g., from the outer surface 56). As shown in FIG. 3, the canister 42 may be secured to the transmission 14 at the flange 80. The flange 80 may be secured to the transmission 14 through one or more mechanical fasteners, welds, adhesives, other suitable fasteners, or combinations thereof. In this way, rotation of cannister 42 about the axis 48 is restricted, impeded, or inhibited. As such, the cannister 42 may be rotatably fixed to the transmission 14.

The cam 44 may be disposed within the annular wall 50 of the cannister 42; for example, adjacent with (and optionally, in contact with) the backing plate 70. The cam 44 may be rotatably secured to the override shaft 24. As such, rotation of the cam 44 may effect a corresponding rotation of the override shaft 24.

The cam 44 may include a cam shelf 90. The cam shelf 90 may be coplanar with the shelf 72 of the cannister 42. A pin 92 may extend (e.g., in a direction of the axis 48) from the cam shelf 90. The pin 92 may be offset from the axis of rotation 48 such that rotational movement of the cam 44 acts to rotate the pin 92 about the axis 48.

The cam 44 may further include a cable interface region. The cable interface region may be disposed at an outer perimeter of the cam 44 and may include a socket 94. The socket 94 may generally define a U-shaped receiving region when viewed along the axial direction of axis 48. The socket 94 may extend through an entire thickness (e.g., in the axial direction of axis 48) of the cam 44. In at least one approach, the socket 94 is provided at a periphery of the cam 44 such that the park-override shaft 24 extends between the pin 92 and the socket 94.

The cable interface region may further include a groove 96. The groove 96 may extend along at least a portion of the outer periphery of the cam 44. The groove 96 may extend from the socket 94. The groove 96 may generally define a U-shaped receiving region when viewed along an axis Y perpendicular to the axial direction of axis 48.

As shown in FIG. 3, a ball portion 100 at an end of the override cable 22 may be received within the socket 94. A longitudinal portion 102 of the override cable 22 may be received within the groove 96. In this way, the override cable 22 may be mechanically secured to the cam 44 at the cable interface region.

In at least one approach, a cover 104 may extend over at least a portion of the override mechanism 40. For example, the cover 104 may extend along the entire annular wall 50 such that the cover 104 extends over the end of the override shaft 24, the cam 44, the pawl 46, and the teeth 62, 64.

The pawl 46 may be rotatably secured to the pin 92 of the cam 44. In this way, the pawl 46 may be rotatable about the pin 92. In at least one approach, pawl 46 may include a detent 110. The detent 110 may extend from a surface of the pawl 46 in the direction of the shelf 72. More particularly, the detent 110 may extend into the return-groove 74. In this way, the return-groove 74 may direct movement of an end of the pawl opposite the pin 92.

In at least one approach, the override mechanism 40 may include one or more springs. The springs may rotationally bias components of the override mechanism 40. For example, referring to FIG. 4, a first spring 112 may be associated with the cam 44 and may bias the cam in a first rotational direction. A second spring 114 may be associated with the pawl 46 and may bias the pawl 46 in a second rotational direction opposite the first rotational direction. In this way, the first spring 112 rotationally biases the pin 92 in the direction of the first tooth 62, and the second spring 114 rotationally biases the pawl 46 toward the inner surface 52 of the annular wall 50. Rotational directions may be adapted to suit a transmission override direction. In the example approach of FIG. 4, the first spring 112 may bias the cam 44 in a clockwise direction, and the second spring 114 may bias the pawl 46 in a counterclockwise direction. However, alternative configurations are expressly contemplated herein. For example, the first spring 112 may rotationally bias the cam 44 in a counterclockwise direction, and the second spring 114 may rotationally bias the pawl 46 in a clockwise direction.

As discussed, the transmission system 12 may permit a user to manually shift the transmission 14 out of a Park gear; for example, when the vehicle 10 does not have sufficient power. The transmission system 12 may allow for a "pull-pull" system in which a user may pull an actuator 20 (e.g., a lever) from within the cabin 30 of the vehicle 10 a first time to manually shift the transmission 14 out of Park and into a Park Override configuration, and may pull the actuator 20 again to manually shift the transmission out of the Park Override configuration and into Park.

For example, vehicle 10 may normally operate in a first configuration, shown in FIG. 5. In this configuration, a Park Override has not been enabled, and a park pawl may engage a park gear (not shown) when a user shifts the vehicle into Park.

In the first configuration, the first spring 112 biases the pin 92 in a first rotational direction (e.g., a clockwise direction), and the second spring 114 biases the pawl 46 in a second rotational direction opposite the first rotational direction (e.g., a counterclockwise direction) and toward the inner surface 52 of the annular wall 50. Due at least in part to these cooperating biases, the pawl 46 is urged into engagement with the first tooth 62, as shown in FIG. 5.

If the vehicle 10 loses power, a user may wish to override the transmission 14. In this way, the user may actuate the actuator 20. Actuating the actuator 20 may effect a translation (e.g., linear or rectilinear) movement of the first end of the override cable 22 at the override mechanism 40. As the override cable 22 is mechanically linked to a periphery of the cam 44, linear movement of the override cable 22 may effect a rotation of the cam 44. In the approach shown, the rotation of the cam 44 is in the counterclockwise direction, in opposition to the rotational force imparted by the first spring 112. However, as discussed, this is only one example of contemplated rotational directions.

Rotation of the cam 44 effects a corresponding rotation of the pin 92 about the axis 48. Rotation of the pin 92 about the axis effects a corresponding rotation of the pawl 46. In this way, the cam 44 may cause the pawl 46 to be rotated. During rotation of the pawl 46, the pawl 46 may follow (e.g., remain engaged with) the inner surface 52 of the annular wall 50. Also during rotation of the pawl 46, the detent 110 of the pawl 46 may translate within the return-groove 74; for example, from the first region 74a to the second region 74b. As the pawl 46 rotates, the second spring 114 may continue to exert a biasing force on the pawl 46; for example, in the direction of the inner surface 52 of the annular wall. In this way, upon sufficient rotational travel of the pawl 46 (which may correspond to a sufficient linear displacement of the ball 100 of the override cable 22), the second spring 114 may bias the pawl 46 into engagement with the second tooth 64, as shown in FIG. 6. In this configuration, referred to herein as the Park Override configuration, the park pawl operation of the transmission 14 is overridden, and the wheels of the vehicle 10 may rotate to permit the car to travel.

To return the transmission 14 to the operational park configuration, a subsequent force (e.g., another pull force) may be imparted at the actuator 20. A subsequent force may further displace the first end of the override cable 22 (e.g., the ball 100 end), causing further rotation of the cam 44. During this rotation (e.g., in the counterclockwise direction), the detent of the pawl 46 engages, or remains engaged with, the return-groove 74; for example, at the second region 74b of the return groove. Release of the subsequent force may permit the cam 44 and pin 92 to rotate in the opposite direction (e.g., in the clockwise direction) due to the biasing force of the first spring 112. Due at least in part to the engagement of the detent 110 with the return-groove 74, the pawl 46 is maintained out of engagement with the second tooth 64. Upon sufficient rotation of the pawl 46, the pawl 46 may again be biased (e.g., due to the biasing force of the second spring 114) into engagement with the first tooth 62. In this way, a user can "disable" a Park Override configuration of the transmission 14.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
    a transmission including a park-override shaft;
    a cannister disposed about the park-override shaft;
    a cam rotatably fixed to the park-override shaft;
    a pawl rotatably secured to the cam; and
    an override cable secured at a first end to the cam and at a second end to an actuator disposed within a cabin of the vehicle, wherein actuation of the actuator rotates the cam and displaces the pawl.

2. The vehicle of claim 1 wherein the override cable includes a ball at the first end, and wherein the cam includes a socket at an outer perimeter of the cam that receives the ball of the override cable.

3. The vehicle of claim 2 wherein the cam includes a groove that extends from the socket at the outer perimeter, wherein the groove receives at least a portion of the override cable.

4. The vehicle of claim 1 wherein the cannister includes an annular wall that extends about the park-override shaft and that includes a peripheral aperture, wherein the override cable extends through the peripheral aperture.

5. The vehicle of claim 4 wherein the cannister includes a flange extending from the annular wall, and wherein the cannister is secured to the transmission at the flange.

6. A vehicle comprising:
    a user-operable actuator disposed within a passenger cabin of the vehicle;
    a transmission including a park-override shaft;
    a cannister having an annular wall extending about a central axis and including first and second teeth located at an inner surface, and a peripheral aperture extending from the inner surface to an outer surface;
    a cam rotatable within the annular wall about the central axis and including a pin;
    a pawl rotatably secured to the pin to engage the first and second teeth; and
    an override cable secured at a first end to the cam and at a second end to the user-operable actuator, wherein actuation of the actuator effects rotation of the cam and park-override shaft into an override configuration, and effects displacement of the pawl from the first tooth to the second tooth to secure the park-override shaft in the override configuration.

7. The vehicle of claim 6 wherein the pawl is engaged with the first tooth when the park-override shaft is in a park configuration, and wherein the pawl is engaged with the second tooth when the park-override shaft is in the override configuration.

8. The vehicle of claim 7 wherein the user-operable actuator is configured to effect a linear movement of the first end of the override cable.

9. The vehicle of claim 8 wherein the linear movement effects displacement of the pawl away from the first tooth when the park-override shaft is in the park configuration, and wherein the linear movement effects displacement of the pawl away from the second tooth when the park-override shaft is in the override configuration.

10. The vehicle of claim 6 wherein a linear translation of the override cable effects a rotational translation of both the cam and the park-override shaft.

11. An override for a transmission, comprising:
    a cannister having an annular wall extending about a central axis and including first and second teeth located at an inner surface, and a peripheral aperture extending from the inner surface to an outer surface;
    a cam rotatable within the annular wall about the central axis and including a pin; and
    a pawl rotatably secured to the pin to engage the first and second teeth.

12. The override of claim 11 wherein the cannister further includes a planar backing plate.

13. The override of claim 12 wherein the cannister further includes a shelf adjacent the first and second teeth and extending in a plane offset from the backing plate.

14. The override of claim 13 wherein the shelf defines a return-groove adjacent the first and second teeth.

15. The override of claim 14 wherein the return-groove is a ramped return-groove having a first depth adjacent the first tooth and a second depth greater than the first depth adjacent the second tooth.

16. The override of claim 15 wherein the pawl includes a detent that extends within the return-groove.

17. The override of claim 13 wherein the cam includes a cam shelf that is coplanar with the shelf.

18. The override of claim 17 wherein the pin extends from the cam shelf.

19. The override of claim 11 further comprising:
    a first spring associated with the cam and adapted to bias the cam in a first rotational direction; and
    a second spring associated with the pawl and adapted to bias the pawl in a second rotational direction opposite the first rotational direction.

20. The override of claim 19 wherein the first rotational direction is clockwise direction, and wherein the second rotational direction is a counter-clockwise direction.

* * * * *